US012810063B2

(12) United States Patent
Jain et al.

(10) Patent No.: US 12,810,063 B2
(45) Date of Patent: Nov. 24, 2026

(54) GENERATING TAILORED MULTI-MODAL RESPONSE(S) THROUGH UTILIZATION OF LARGE LANGUAGE MODEL(S) AND/OR OTHER GENERATIVE MODEL(S)

(71) Applicant: GOOGLE LLC, Mountain View, CA (US)

(72) Inventors: Sanil Jain, Sunnyvale, CA (US); Marcelo Menegali, San Francisco, CA (US); Thang Luong, Santa Clara, CA (US); Golnaz Ghiasi, Mountain View, CA (US); Quoc Le, Sunnyvale, CA (US); Aaron Cohen, Newark, CA (US); Elle Chae, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 131 days.

(21) Appl. No.: 18/413,878

(22) Filed: Jan. 16, 2024

(65) Prior Publication Data

US 2025/0217585 A1 Jul. 3, 2025

Related U.S. Application Data

(60) Provisional application No. 63/615,657, filed on Dec. 28, 2023.

(51) Int. Cl.
*G06F 40/20* (2020.01)

(52) U.S. Cl.
CPC .................................... *G06F 40/20* (2020.01)

(58) Field of Classification Search
CPC ................................. G06F 40/00; G06F 40/20
See application file for complete search history.

(56) References Cited

U.S. PATENT DOCUMENTS

| | | | |
|---|---|---|---|
| 2018/0246864 | A1 | 8/2018 | Ehlen |
| 2021/0232589 | A1 | 7/2021 | Nelson |

(Continued)

OTHER PUBLICATIONS

Ouyang, L., Wu, J., Jiang, X., Almeida, D., Wainwright, C., Mishkin, P., Zhang, C., Agarwal, S., Slama, K., Ray, A. and Schulman, J ., 2022. Training language models to follow instructions with human feedback. Advances in neural information processing systems, 35, pp. 27730-27744. (Year: 2022).*

(Continued)

*Primary Examiner* — Sean E Serraguard
(74) *Attorney, Agent, or Firm* — Gray Ice Higdon

(57) ABSTRACT

Implementations relate to generating tailored multi-modal response(s) through utilization of large language model(s) (LLM(s)). In some implementations, processor(s) of a system can: receive natural language (NL) based input indicative of a request for a set of slides to be generated, generate a multi-modal response, using an LLM, that is responsive to the NL based input, the multi-modal response comprising a generated set of slides, and cause the multi-modal response to be rendered at the client device of the user. In additional or alternative implementations, the NL based input can be indicative of a request for assistance with completing a particular task. In these implementations, the processor(s) can generate the multi-modal response comprising assistive content for assisting the user in performing the particular task. In various implementations, the LLM can be fine-tuned prior to receiving the NL based input.

20 Claims, 7 Drawing Sheets

(56) References Cited

U.S. PATENT DOCUMENTS

| | | | | |
|---|---|---|---|---|
| 2022/0180052 | A1* | 6/2022 | Yu | H04N 7/147 |
| 2022/0261817 | A1* | 8/2022 | Ferrucci | G16H 70/20 |
| 2022/0366153 | A1* | 11/2022 | Li | G06F 16/24578 |
| 2023/0177878 | A1 | 6/2023 | Sekar | |
| 2024/0126981 | A1* | 4/2024 | Shahinian | G06F 40/40 |
| 2024/0257420 | A1* | 8/2024 | Yang | G06F 40/58 |
| 2024/0289360 | A1* | 8/2024 | Chepkwony | G06F 16/3328 |
| 2024/0377932 | A1* | 11/2024 | Zhao | G06F 3/04842 |

OTHER PUBLICATIONS

European Patent Office; International Search Report and Written Opinion issued in Application No. PCT/US2024/062106; 11 pages; dated Mar. 19, 2025.

* cited by examiner

GENERATING TAILORED MULTI-MODAL RESPONSE(S) THROUGH UTILIZATION OF LARGE LANGUAGE MODEL(S) AND/OR OTHER GENERATIVE MODEL(S)

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device and generate a response that is responsive to the NL based input and that is to be rendered at the client device. In many instances, these LLMs can cause textual content to be included in the response. In some instances, these LLMs can additionally, or alternatively, cause multimedia content, such as images, to be included in the response. These responses that include both textual content and multimedia content are referred to herein as multi-modal responses.

However, the multimedia content in these multi-modal responses is often pre-pended or post-pended to the textual content. As a result, the multimedia content is not contextualized with respect to the textual content in these multi-modal responses, nor with respect to the context in which the multi-modal responses are to be presented to a user. Not only does this lack of contextualization detract from the user experience, but it may also result in computational resources being unnecessarily consumed. These issues may be exacerbated when a user is interacting with these LLMs via a client device that has limited display real estate and/or high precision input options, such as a mobile phone, as well as when the user has an impairment affecting their ability to interact with the client device. For instance, if the multi-modal response includes multiple paragraphs of text and one or more corresponding images associated with each of the multiple paragraphs of text, but all of the corresponding images are pre-pended and/or post-pended to the text, then the user may consume all of the text prior to viewing the images, or vice versa. As a result, the user may consume a portion of the textual content, then scroll up or down to view the corresponding image for that paragraph, and then scroll back up or down to continue consuming a next paragraph. Furthermore, the format of the multi-modal response may be unsuitable for any particular use of the multi-modal response, requiring the user to modify the position or order of the various components of the multi-modal response for an intended use of the multi-modal response. However, this unnecessarily consumes computational resources, in the aggregate across a population of users, due to an increased quantity of user inputs, and prolongs a duration of the human-to-computer interaction between the user and the LLM.

SUMMARY

Implementations described herein relate to generating multi-modal response(s) through utilization of generative model(s), such as large language model(s) (LLM(s)), for particular types of applications, such as for sets of slides (or otherwise termed, slide decks, presentation slides, etc.). Processor(s) of a system can: receive natural language (NL) based input associated with a client device of a user, the NL based input being indicative of a request for a set of slides to be generated or a request for assistance with completing a particular task; generate a multi-modal response that is responsive to the NL based input and that includes textual content and multimedia content, the multi-modal response including a generated set of slides or other assistive content for assisting the user with completing the particular task, and cause the multi-modal response to be rendered at the client device of the user. Accordingly, the multimedia content is logically arranged with respect to the textual content and the type of application. Furthermore, the arrangement of the multimedia content and textual content is consistent with the particular intended use of the multi-modal response. This results in a more natural interaction that not only guides a human-to-computer interaction between the user and the system through utilization of the LLM, but also conserves computational resources in consumption of the multi-modal response.

For example, assume that the system receives NL based input of "How do I configure my router as an Access Point". In this example, multi-modal response can include step by step instructions, where each discrete step can be presented as a discrete "slide" containing textual content and/or multimedia content to assist the user in performing the task referred to in the NL based input or presented as other discrete assistive content. The textual content of a given slide can include a description of the instruction for the corresponding step. Further, the multimedia content can include various multimedia content items associated with the corresponding step, such as images, videos, audio, gifs, or the like. In some cases, the multimedia content can be available to the client device (e.g., via an internet search) and as a result can be retrieved from any number of sources, as described herein. In other cases, the multimedia content may not be available to the client device (e.g., because performance of the particular step of the task has not been documented). For instance, there may exist no images, videos, audio, gifs, or the like of the particular step of the task. Nonetheless, in generating the multi-modal response to be rendered at the client device, the system can interact with other generative model(s) capable of processing generative multimedia content prompts to generate images, videos, audio, gifs, or the like relating to the particular step of the task. The multimedia content associated with a particular step can be interleaved with respect to the textual content associated with the step all with only a single call to the LLM (e.g., a so-called "one-shot" approach) in a form suitable for the task at hand (e.g., in this case, to assist a user in configuring a router to act as an Access Point, the content can be arranged as a sequence of step by step instructions, as described). In this way, implementations described herein can effectively assist a user in performing a task.

In some implementations, there may exist a document available to the client device including information relating to the task referred to in the NL based input. For instance, a user manual for the router may be published on the internet. However, the user manual will likely include myriad information irrelevant to the task at hand (e.g., information regarding other configuration settings for the router, information regarding other models of routers, etc.), making the relevant information difficult to identify. Even if the user is able to locate information relevant for performing the task in the user manual, it may be in a form which is difficult to follow (e.g., if it is presented as a single large block of text, if it includes large amounts of technical terminology, etc.). In this case, the multi-modal response can be generated based on processing the document using the LLM. As such, the multi-modal response can provide the instructions in a form which can better assist the user in performing the task referred to in the NL based input (e.g., a series of discrete steps each including an appropriate amount of textual content interleaved with relevant multimedia content). Furthermore, the multi-modal response can include references (e.g., such as Uniform Resource Locators (URLs)) to the source of textual content and/or multimedia content. For instance, if the multi-modal response is generated based on processing a user manual, as discussed herein, a URL to the user manual can be provided. In this way, the user can confirm the veracity of the instructions present in the multi-modal response given the potential of LLM output to be provided as a result of so called "hallucination" and mitigate and/or eliminate occurrences thereof.

Although many examples described herein relate to providing instructions to assist a user in performing a task referred to in a NL based input, it will be appreciated that the techniques described herein can be used to generate multimodal responses in forms suitable for any number of purposes. For instance, the NL based input can explicitly (or implicitly) relate to a request to generate a set of slides (e.g., a set of presentation slides). As an example, assume that the system receives the NL based input of "Can you create a slide deck about the history of pizzas". Responsively, a multi-modal response can be generated, using a LLM fine-tuned as described herein, including textual content and multimedia content arranged in a manner tailored for this purpose. For instance, the multi-modal response can include a set of slides, where each slide includes an appropriate amount of textual content and/or multimedia content. The multi-modal response can also include "speaker notes" for each slide, e.g., textual content which is intended to be spoken by the presenter, but which is not intended to be included on the slide itself. In this way, the user can be assisted in the task of generating a set of slides. For instance, since the user is provided a multi-modal response including textual content and multimedia content already arranged into slides (and optionally speaker notes), the user need not rearrange content in the multi-modal response, or source their own textual content and/or multimedia content. As a result, the number of interactions to generate the set of slides can be reduced, and the corresponding computational resources which would otherwise be consumed as a result of these interactions can be conserved. Furthermore, the techniques described herein can enable the generation of sets of slides on devices which have limited input means, and particularly devices which have limited high precision input means (e.g., a smartphone with a relatively small touch screen display but lacking, for instance, a physical mouse and keyboard, a smart speaker without a display, etc.), as well as by a user having an impairment affecting their ability to provide high precision input to a client device.

Put another way, implementations described herein can provide a mechanism enabling user input. For instance, the techniques described can enable a user to provide a NL based input to generate a set of slides. In response, according to the techniques described herein, a multi-modal response responsive to the NL based input already arranged as a set of slides, where a given slide includes textual content and multimedia content, can be generated.

In some implementations, one or more additional signals can be considered when generating the multi-modal response. The additional signals can be indicative of configuration data (e.g., desired parameters of the set of slides to be generated). The additional signals can be obtained from the NL based input. For instance, the user can include explicit instructions in the NL based input (e.g., the NL based input can explicitly specify that the multi-modal response should include exactly 10 slides). Additionally, or alternatively, implicit additional signal(s) can be inferred from the NL based input. For instance, the NL based input can specify that the slides are for young children, and responsively it can be determined to include a large amount of image content in the slides (e.g., relative to the textual content). The additional signals can additionally or alternatively be obtained from contextual data (e.g., information other than the NL based input, such as user data, device data, etc.). For instance, the types of multimedia content which should be included in the multi-modal response can be determined based on the types of multimedia content the client device is capable of rendering. As another example, there can be predetermined default values which can be used in lieu of any indication to the contrary. Additionally, or alternatively, the additional signals can be obtained based on one or more additional user inputs (e.g., text entered other than the NL based input to generate the set of slides, selection or non-selection of check boxes provided via a graphical user interface (GUI) to indicate desired parameters of the generated slides, user settings set at a time preceding the generation of the set of slides, etc.). The additional signals can be used to determine, for instance, a number of slides to be included in the set of slides, a duration of a presentation based on the set of slides (which might influence, e.g., the number of slides, the amount of textual content on each slide, the length of speaker notes generated for each slide, etc.), the types and relative quantities of multimedia content to include in the set of slides, etc.

In some implementations, the system can be provided as a standalone application (e.g., a standalone NL based response system application). In some other implementations, the system can be provided as part of another application (e.g., as a plug-in, an add-on, etc.). For instance, the system can be provided as an extension (e.g., as an additional toolbar) of a presentation application. As such, in implementations including a determination as to whether to tailor the multi-modal response for a specific type of task, the determination can be based on whether the NL based input was received via an application associated with the particular type of task, whether the application is running or installed on the client device, etc. For instance, a determination can be made to generate a multi-modal response arranged as a set of slides based on the NL based input being received via a presentation application.

Furthermore, in some implementations, the system can output the multi-modal response in a form usable by an application other than the system (in addition to or instead of rendering the multi-modal response at the client device). For instance, the system can output the multi-modal response in a file format associated with the particular type of intended use of the multi-modal response. As an example, when the multi-modal response includes a set of slides, the system can output the multi-modal response in a file format associated with presentations (e.g., .ppt, .pptx, .odp, etc.). The user can thus store the multi-modal response (e.g., at the client device, at a remote computing device accessible to the client device and/or the system, etc.) for subsequent use by the appropriate application.

In some implementations, a subsequent NL based input can be received via the client device (e.g., subsequent to the multi-modal response being rendered at the client device). The subsequent NL based input can be indicative of a request for a modification to the set of slides of the multi-modal response. The subsequent NL based input can be processed to provide a subsequent LLM input to the LLM to update the set of slides of the multi-modal response accordingly. The subsequent LLM input (and optionally the original LLM output and/or the multi-modal response that was generated based on the original LLM input) can be processed using the LLM to generate updated LLM output. An updated multi-modal response can then be generated and rendered at the client device. For instance, some or all of the multimedia content of the multi-modal response can be updated and/or some or all of the textual content of the multi-modal response can be updated accordingly. For instance, continuing with the above example where the NL based input is the prompt of "How do I configure my router as an Access Point", the subsequent NL based input can be "Those images are using operating system Y. I am using operating system X". As a result, the multi-modal response can be updated such that, for instance, images including the graphical user interface (GUI) of operating system X can be changed to instead include the GUI of operating system Y.

In some implementations, the multi-modal response can be rendered at the client device in a manner tailored to the intended use of the multi-modal response. For instance, each slide of a set of generated slides included in the multi-modal response can be rendered as a distinct graphical element on a GUI rendered on a display of the client device. In other words, textual content and multimedia content associated with a given slide can be rendered in a particular area of the display associated with the slide. For instance, textual content associated with a given slide can be rendered in a first portion of a GUI rendered on a display of the client device, and multimedia content can be rendered in the second portion of the GUI. The first portion and the second portion can thus form at least part of the given slide. Furthermore, in some implementations, as described herein, additional textual content (e.g., speaker notes) which is associated with a given slide but is nonetheless not intended to form part of the given slide (e.g., when it is presented), can be included in the multi-modal response. As such, the additional textual content can be rendered in a third portion of the GUI, where the third portion does not form part of the given slide but is associated with the given slide.

In some implementations, and prior to the LLM being utilized in generating the multi-modal responses, the system can fine-tune the LLM to subsequently enable the LLM to determine where the multimedia content (e.g., generative multimedia content or non-generative multimedia content) should be included in the multi-modal responses relative to the textual content for a particular intended use. For example, for the generative multimedia content, the system can obtain a plurality of training instances where each of the plurality of training instances includes: (1) a corresponding NL based input; and (2) a corresponding multi-modal response that is responsive to the corresponding NL based input, the corresponding multi-modal response including a corresponding generated set of slides, wherein the corresponding multi-modal response includes, for a given slide of the generated set of slides, corresponding textual content and one or both of corresponding multimedia content tag(s) that is indicative of corresponding multimedia content item(s) to be included in the multi-modal response, and corresponding generative multimedia content prompt(s) indicative of corresponding generative multimedia content item(s) to be included in the corresponding multi-modal response.

By using the techniques described herein, various technical advantages can be achieved. As one non-limiting example, by tailoring multi-modal responses for particular tasks (e.g., for generating a set of slides, by arranging the multi-modal responses as discrete slides, where a given slide includes textual content and multimedia content, and by interleaving the textual content with the multimedia content on a given slide), a quantity of user inputs received at the client device can be reduced, thereby conserving computational resources. While the conservation of computational resources may be relatively minimal at a single client device, the conservation of computational resources, in aggregate, across a population of client devices can be substantial. For instance, users need not scroll up or down to view contextually relevant multimedia content, nor do they need to manually rearrange the content for the intended task. As another non-limiting example, arranging the multimedia content with respect to the textual content in a form suitable for the intended task can result in a more natural interaction that not only guides a human-to-computer interaction between the user and the system through utilization of the LLM, but also conserves computational resources in consumption of the multi-modal response. As yet another non-limiting example, latency in causing the multi-modal response to be rendered can be reduced since the textual content can be rendered while the multimedia content is being obtained, and the LLM provides an indication of what the multimedia content should include via the multimedia content tags and/or the generative multimedia content prompts, as well as an indication of the discrete "slides" and the content thereof, thereby further reducing latency in actually obtaining the multimedia content. As yet another non-limiting example, by enabling the LLM to obtain the generative multimedia content from the other generative model(s), the user need not directly interact with these other generative model(s) by launching another software application, web browser, or tab, thereby conserving computational resources not only by obviating the need to launch another software application, web browser, or tab, but by obviating this interaction altogether.

The above description is provided as an overview of some implementations of the present disclosure. Further description of those implementations, and other implementations, are described in more detail below.

DETAILED DESCRIPTION OF THE DRAWINGS

Figure 1:
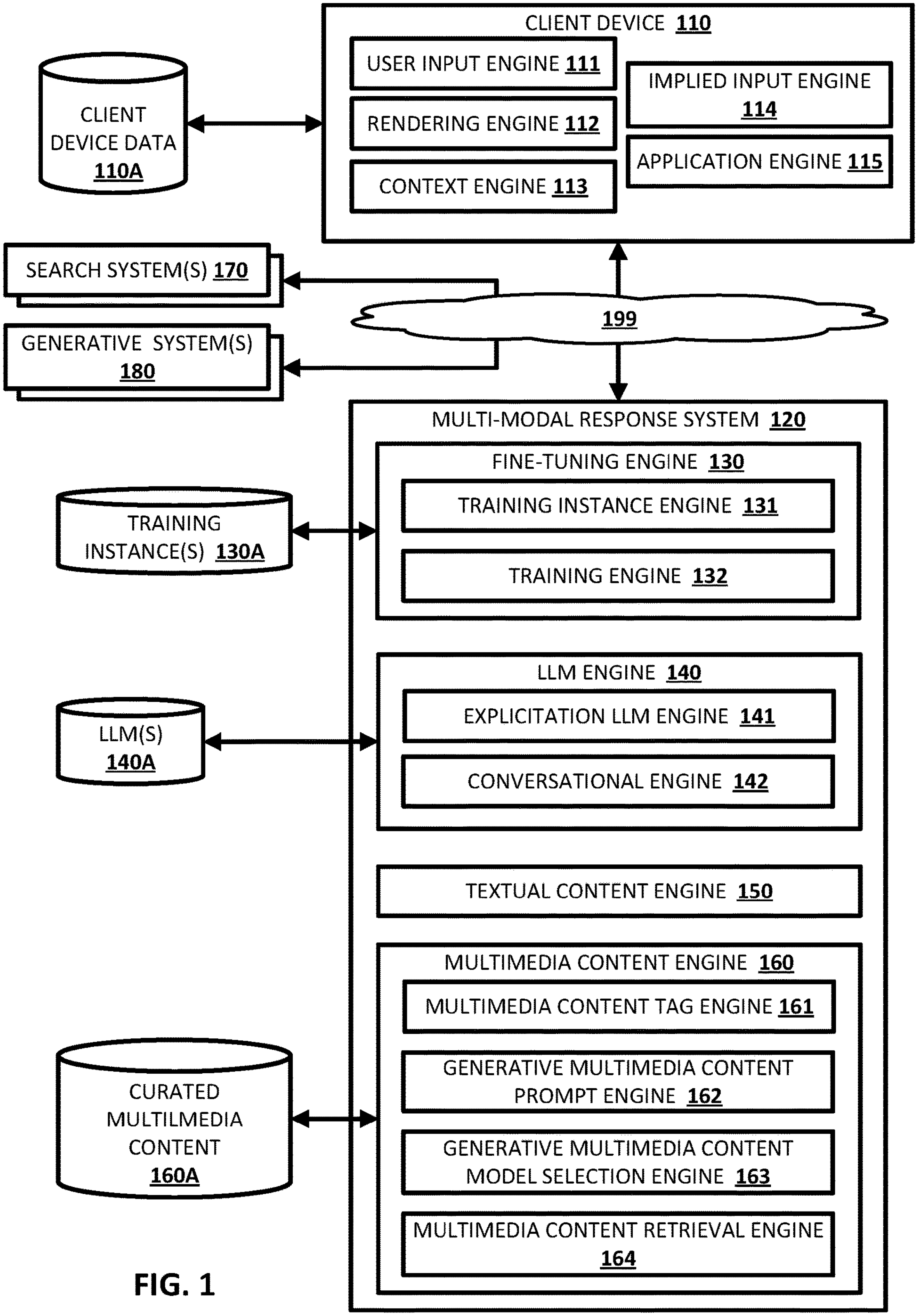
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a multi-modal response system 120. In some implementations, all or aspects of the multi-modal response system 120 can be implemented locally at the client device 110. In additional or alternative implementations, all or aspects of the multi-modal response system 120 can be implemented remotely from the client device 110 as depicted in FIG. 1 (e.g., at remote server(s)). In those implementations, the client device 110 and the multi-modal response system 120 can be communicatively coupled with each other via one or more networks 199, such as one or more wired or wireless local area networks ("LANs," including Wi-Fi®, mesh networks, Bluetooth®, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or multi-modal responses and/or other responses (e.g., uni-modal responses) that are responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with or otherwise provide access to (e.g., as a front-end) the multi-modal response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed and/or touch inputs directed to the client device 110.

Some instances of a NL based input described herein can be a query for a response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image or video prompt that is based on an image or video captured by a vision component of the client device 110.

In various implementations, the client device 110 can include a rendering engine 112 that is configured to render content (e.g., uni-modal responses, multi-modal responses, an indication of source(s) associated with portion(s) of the uni-modal and/or multi-modal responses, and/or other content) for audible and/or visual presentation to a user of the client device 110 using one or more user interface output devices. For example, the client device 110 can be equipped with one or more speakers that enable audible content to be provided for audible presentation to the user via the client device 110. Additionally, or alternatively, the client device 110 can be equipped with a display or projector that enables textual content or other visual content (e.g., image(s), video(s), etc.) to be provided for visual presentation to the user via the client device 110.

In various implementations, the client device 110 can include a context engine 113 that is configured to determine a client device context (e.g., current or recent context) of the client device 110 and/or a user context of a user of the client device 110 (or an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a geographical region associated with a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., a response) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a response for the implied NL based input, optionally independent of any explicit NL based input that requests rendering of the search result(s) or the response. For example, the implied input engine 114 can use one or more past or current contexts, from the context engine 113, in generating an implied NL based input, determining to submit the implied NL based input, and/or in determining to cause rendering of search result(s) or a response that is responsive to the implied NL based input. For instance, the implied input engine 114 can automatically generate and automatically submit an implied query or implied prompt based on the one or more past or current contexts. Further, the implied input engine 114 can automatically push the search result(s) or the response that is generated responsive to the implied query or implied prompt to cause them to be automatically rendered or can automatically push a notification of the search result(s) or the response, such as a selectable notification that, when selected, causes rendering of the search result(s) or the response. Additionally, or alternatively, the implied input engine 114 can submit respective implied NL based input at regular or non-regular intervals, and cause respective search result(s) or respective responses to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective responses can be automatically provided (or a notification thereof automatically provided). It is noted that the respective search result(s) or the response can vary over time in view of, e.g., presence of new/fresh search result document(s) over time.

Further, the client device 110 and/or the multi-modal response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The multi-modal response system 120 is illustrated in FIG. 1 as including a fine-tuning engine 130, a LLM engine 140, a textual content engine 150, and a multimedia content engine 160. Some of these engines can be combined and/or omitted in various implementations. Further, these engines can include various sub-engines. For instance, the fine-tuning engine 130 is illustrated in FIG. 1 as including a training instance engine 131 and a training engine 132. Further, the LLM engine 140 is illustrated in FIG. 1 as including an explicitation LLM engine 141 and a conversational LLM engine 142. Moreover, the multimedia content engine 160 is illustrated in FIG. 1 as including a multimedia content tag engine 161, a generative multimedia content prompt engine 162, a generative multimedia content model selection engine 163, and a multimedia content retrieval engine 164. Similarly, some of these sub-engines can be combined and/or omitted in various implementations. Accordingly, it should be understood that the various engines and sub-engines of the multi-modal response system 120 illustrated in FIG. 1 are depicted for the sake of describing certain functionalities and is not meant to be limiting.

Further, the multi-modal response system 120 is illustrated in FIG. 1 as interfacing with various databases, such as training instance(s) database 130A, LLM(s) database 140A, and curated multimedia content database 160A. Although particular engines and/or sub-engines are depicted as having access to particular databases, it should be understood that is for the sake of example and is not meant to be limiting. For instance, in some implementations, each of the various engines and/or sub-engines of the multi-modal response system 120 may have access to each of the various databases. Further, some of these databases can be combined and/or omitted in various implementations. Accordingly, it should be understood that the various databases interfacing with the multi-modal response system 120 illustrated in FIG. 1 are depicted for the sake of describing certain data that is accessible to the multi-modal response system 120 and is not meant to be limiting.

Moreover, the multi-modal response system 120 is illustrated in FIG. 1 as interfacing with other system(s), such as search system(s) 170 and generative system(s) 180. In addition to multimedia content that is included in the curated multimedia content database 160A, the multimedia content retrieval engine 163 can generate and transmit requests to the search system(s) 170 and/or the generative system(s) 180 to obtain multimedia content to be included in a multi-modal response as described herein. In some implementations, the search system(s) 170 and/or the generative system(s) 180 are first-party system(s), whereas in other implementations, the search system(s) 170 and/or the generative system(s) 180 are third-party system(s). As used herein, the term "first-party" refers to an entity that develops and/or maintains the multi-modal response system 120, whereas the term "third-party" or "third-party entity" refers to an entity that is distinct from the entity that develops and/or maintains the multi-modal response system 120.

As described in more detail herein (e.g., with respect to FIGS. 2, 3, 4, 5A, and 5B), the multi-modal response system 120 can be utilized to generate multi-modal responses that are responsive to corresponding NL based inputs received at the client device 110 and are provided in a manner suitable for their intended use. The multi-modal responses described herein can include not only textual content that is responsive to the corresponding NL based inputs, but can also include multimedia content that is responsive to the corresponding NL based inputs. The multimedia content can include multimedia content items, such as images, video clips, audio clips, gifs, and/or any other suitable multimedia content. In implementations where the multimedia media content is obtained using the search system(s) 170, the multimedia content can be considered "non-generative multimedia content". In implementations where the multimedia content is obtained using the generative system(s) 180, the multimedia content can be considered "generative multimedia content". Unless explicitly noted otherwise, the non-generative multimedia content and the generative multimedia content is collectively referred to herein as "multimedia content".

Notably, the multimedia content can be particularly relevant to a portion of the textual content. Accordingly, in generating the multi-modal responses, techniques described herein enable the multimedia content to be interleaved with respect to the textual content (e.g., as described and illustrated with respect to FIGS. 5A and 5B) and arranged in a manner suitable for an intended use of the multi-modal response. Put another way, the multimedia content items that are particularly relevant to a portion of the textual content can be rendered along with the portion of the textual content, rather than being pre-pended to the textual content or post-pended to the textual content, and corresponding multimedia content items and portions of textual content can be arranged into discrete elements (e.g., such as slides of a slide deck). As a result, computational resources can be conserved since a quantity of user inputs to arrange the multimedia content and the textual content for the intended use are reduced and a duration of a human-to-computer dialog is reduced. Additional description of the multi-modal response system 120 is provided herein (e.g., with respect to FIGS. 2, 3, and 4).

Figure 2:
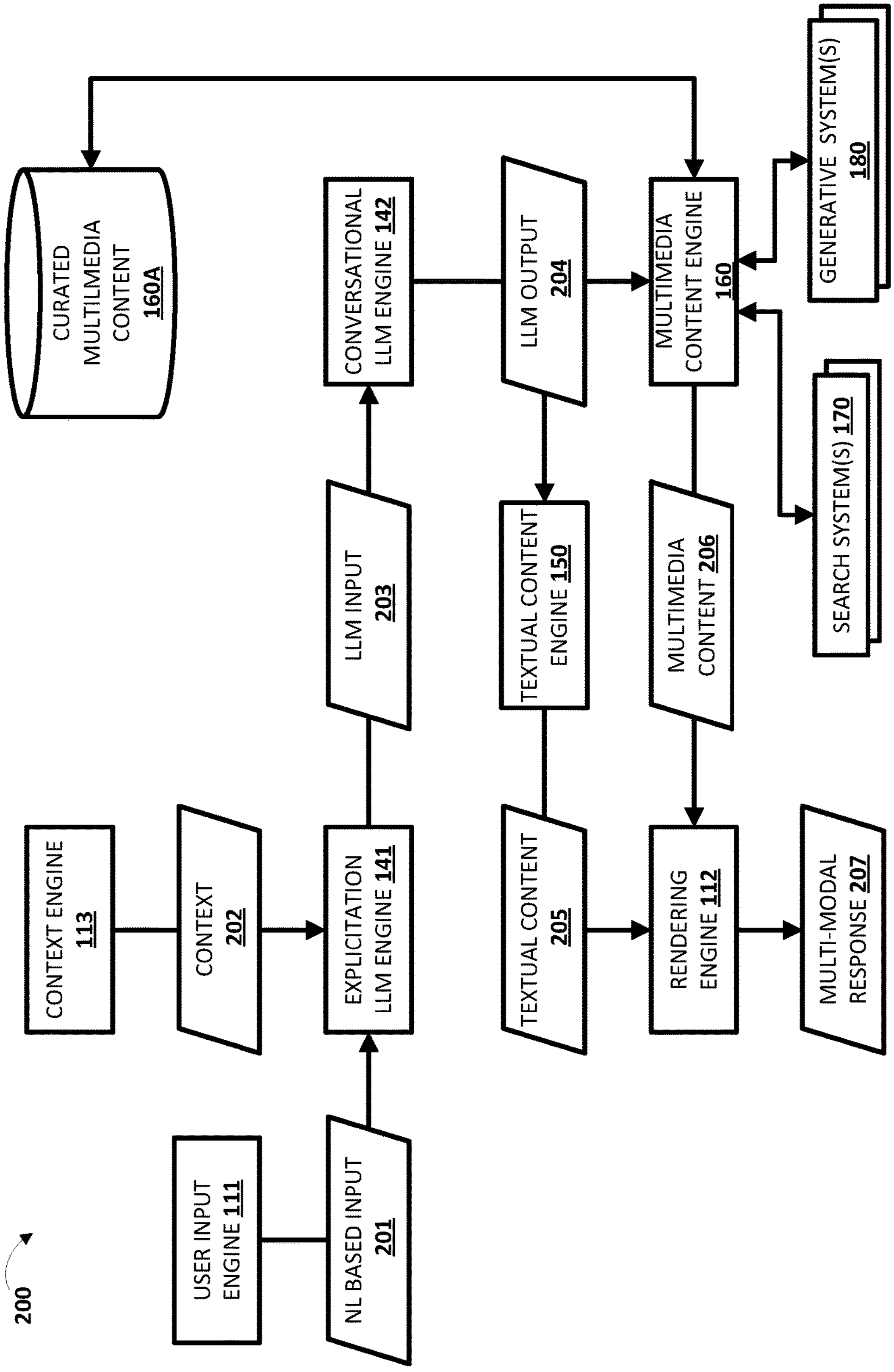
FIG. 2 depicts an example process flow of generating multi-modal response(s) through utilization of large language model(s) (LLM(s)) using various components from FIG. 1, in accordance with various implementations.

Turning now to FIG. 2, an example process flow 200 of generating multi-modal response(s) through utilization of large language model(s) (LLM(s)) using various components from FIG. 1 is depicted. For the sake of example, assume that the user input engine 111 of the client device detects NL based input 201. For instance, assume that the NL based input 201 is a prompt of "show me how to change the oil for a [vehicle model name]". Although the process flow 200 of FIG. 2 is described with respect to the NL based input 201 being explicit NL based input, it should be understood that is for the sake of example and is not meant to be limiting. For instance, the NL based input 201 can additionally, or alternatively, be implied NL based input (e.g., as described with respect to the implied input engine 114).

Further assume that the NL based input 201 is provided to the explicitation LLM engine 141. The explicitation LLM engine 141 can be one form of an LLM that processes the NL based input 201 (and optionally context 202 determined by the content engine 113 of the client device) to generate LLM input 203. The LLM input 203 can then be provided to the conversational LLM engine 142 to generate LLM output 204. Put another way, the explicitation LLM 141 can process the raw NL based input 201 and put it in a structured form that is more suitable for processing by the conversational LLM engine 142. The explicitation LLM and/or the conversational LLM utilized by these respective engines can include, for example, any LLM that is stored in the LLM(s) database 140A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory, and that is fine-tuned to generate multimedia content tags and/or generative multimedia content prompts as described herein (e.g., with respect to FIG. 3). Notably, in generating the LLM input 203, the explicitation engine 141 can also process a prompt that indicates the raw NL based input 201 (and optionally the context 202) should be put in the structured form that is more suitable for processing by the conversational LLM engine 142.

In some implementations, the explicitation LLM engine 141 can generate one or more queries based on the NL based input 201 and submit the query to one or more search systems (e.g., the search system(s) 170), and process the search result document(s) in generating the LLM input 203. Accordingly, not only can this information be included in the LLM input 203 for use in subsequently determining textual content, but it can be included in the LLM input 203 for use in subsequently determining multimedia content to be included in a multi-modal response.

In some implementations, one or more additional signal(s) can be considered when generating the multi-modal response. For instance, the additional signal(s) can be provided to the explicitation LLM engine 141 such that the additional signal(s) can be incorporated into the LLM input 203. The additional signal(s) can be indicative of configuration data (e.g., desired parameters of the set of slides to be generated). In some versions of these implementations, the additional signal(s) can be obtained from the NL based input 201. For instance, the user can include explicit instructions in the NL based input 201 (e.g., the NL based input can explicitly specify that the multi-modal response should include exactly 10 slides). In additional or alternative implementations, implicit additional signal(s) can be inferred from the NL based input 201. For instance, the NL based input can specify that the slides are for young children, and responsively it can be determined to include a large amount of image content in the slides (e.g., relative to the textual content). The additional signal(s) can additionally or alternatively be obtained from contextual data (e.g., information other than the NL based input, such as user data, device data, etc.). For instance, the types of multimedia content which should be included in the multi-modal response can be determined based on the types of multimedia content the client device is capable of rendering. As another example, there can be predetermined default values which can be used in lieu of any indication to the contrary. Additionally, or alternatively, the additional signal(s) can be obtained based on one or more additional user input(s) (e.g., text entered other than the NL based input to generate the set of slides, selection or non-selection of check boxes to indicate desired parameters of the generated slides, user settings set at a time preceding the generation of the set of slides, etc.). The additional signal(s) can be used to determine, for instance, a number of slides to be included in the set of slides, a duration of a presentation based on the set of slides (which might influence, e.g., the number of slides, the amount of textual content on each slide, the length of speaker notes generated for each slide, etc.), the types and relative quantities of multimedia content to include in the set of slides, etc.

In some implementations, the LLM input can be generated using a template (e.g., using the explicitation LLM engine 141 or otherwise). The template can be configured to guide the conversational LLM engine 142 to generate the LLM output 204 in a form suitable for an intended task. The template can also include one or more variables which can be set based on configuration data. As described herein, the configuration data can be determined based on, for instance, the NL based input 201 (e.g., where a portion of the NL based input 201 can explicitly or implicitly specify the configuration data), contextual information other than the NL based input 201 (e.g., a type of device, user history information, etc.), and/or default values. For instance, the configuration data can be indicative of a number of slides to be included in the multi-modal response, a duration of a presentation that can be given using the slides, and/or the type(s) and/or quantity of the multimedia content to include in the slides. An example of a template which can be used for this purpose is provided below, where elements which could be modified based on configuration data are indicated with the symbol %:

Template 1

I'm going to show you a request for the generation of a slide deck. I need you to respond to this request by producing % 5 to % 10 slides on the desired topic. Each slide should have a % title, % bullet points with content, an % image description and % a section with speaker notes. Here is an example slide:

Slide 1

This is the slide title

*Bullet point 1

*Bullet point 2

*Bullet point 3

[Image of a picture of the underside of a vehicle with an indication of the relevant components]

Speaker notes: The verbatim word-by-word script of what the person should say when presenting these slides goes here Please use this format for slides but replace it with the appropriate content to fulfill the request.

Here is the request I want you to respond to: "<NL based input>"

Further, in generating the LLM output 204, the conversational LLM engine 142 can generate the LLM output 204 as, for example, a probability distribution over a sequence of tokens, such as words, phrases, or other semantic units that are predicted to be responsive to the NL based input 201, non-generative multimedia content tags for use in obtaining non-generative multimedia content that is predicted to be responsive to the NL based input 201, and/or generative multimedia content prompts for use in obtaining generative multimedia content that is predicted to be responsive to the NL based input 201. The LLM can include millions or billions of weights and/or parameters that are learned through training the LLM on enormous amounts of diverse data. This enables the LLM to generate the LLM output as the probability distribution over the sequence of tokens. Further, the LLM can be fine-tuned (e.g., as described with respect to FIG. 3) to enable the LLM to generate the LLM output including the sequence of tokens over the non-generative multimedia content tags and/or the generative multimedia content prompts, in an appropriate form.

Further assume that the LLM output 204 is provided to both the textual content engine 150 and the multimedia content engine 160. In this instance, the textual content engine 150 can determine, based on the probability distribution over the sequence of tokens (e.g., over the words, phrases, or other semantic units), textual content 205 that is to be included in a multi-modal response 207 that is responsive to the NL based input. Continuing with the above example where the NL based input is the prompt of "show me how to change the oil for a [vehicle model name]", the textual content 205 can include step by step instructions including, for instance, a first step describing what tools and materials are required, a second step describing how to locate the relevant components on the particular vehicle, a third step describing what safety checks should be carried out, a fourth step describing the operations required to remove the old oil and replace with new oil, and/or other textual content.

Also, in this instance, the multimedia content engine 160 can determine, based on the probability distribution over the sequence of tokens (e.g., over the non-generative multimedia content tags and/or the generative multimedia content prompts), multimedia content 206 that is to be included in the multi-modal response 207 that is responsive to the NL based input 201. As noted above, the conversational LLM utilized by the conversational LLM engine 142 to generate the LLM output 204 can be fine-tuned to generate non-generative multimedia content tags and/or generative multimedia content prompts (e.g., as described with respect to FIG. 3) in a format suitable for the intended task. The multimedia content tag engine 161 can parse the LLM output 204 itself and/or the textual content 205 to identify any non-generative multimedia content tags. Further, the generative multimedia content prompt engine 162 can parse the LLM output 204 itself and/or the textual content 205 to identify any generative multimedia content prompts. Continuing with the above example where the NL based input 201 is the prompt of "show me how to change the oil for a [vehicle model name]", the LLM output 204 itself and/or the textual content 205 can include non-generative multimedia content tags (e.g., because documentation of the process of changing oil on [vehicle model name] is available). Additionally, or alternatively, the LLM output 204 itself and/or the textual content 205 can include generative multimedia content prompts to be submitted to various generative model(s) (e.g., an image generator, a video generator, and/or an audio generator) to generate the multi-modal response specifically requested by the user. For instance, the LLM output 204 itself and/or the textual content 205 can include a generative multimedia content prompt of "{prompt: [image of underside of [vehicle model name] with indication of the relevant components] image generator {url: . . . }}". Notably, in the LLM output 204 itself and/or in the textual content 205, these non-generative multimedia content tags and/or generative multimedia content prompts can be interleaved with respect to the textual content 205 and/or included on respective slides in implementations where the multi-modal response includes the generated set of slides.

However, it should be noted that the non-generative multimedia content tags and generative multimedia content prompts are not included in the multi-modal response 207 that is rendered for presentation to the user that provided the NL based input 201. Rather, the non-generative multimedia content tags and generative multimedia content prompts are replaced with the multimedia content 206 corresponding to the multimedia content that is retrieved based on the non-generative multimedia content tags and/or generated based on the generative multimedia content prompts.

For instance, the multimedia content items can be obtained from the search system(s) 170 (e.g., image search system(s), video search system(s), audio search system(s), gif search system(s), and/or other multimedia content search systems). In these implementations, the search system utilized to obtain the multimedia content items can be dependent on what type of multimedia content is indicated by the multimedia content tags. In additional or alternative implementations, multimedia content items can be obtained from the curated multimedia content database 160A. In these implementations, the multimedia content retrieval engine 163 can submit the multimedia search queries over the curated multimedia content database 160A if an entity identified in the multimedia content tag is a particular type of entity that, for example, may be considered sensitive, personal, controversial, etc. For instance, if the multimedia content tag indicates that an image of the President of the United States should be included in the multi-modal response 207, then an official presidential headshot from the curated multimedia content database 160A can be obtained as the multimedia content 206. However, it should be understood that whether the LLM output 204 itself and/or the textual content 205 includes the multimedia content tags (rather than the generative multimedia content prompts described above) may be dependent on the NL based input 201 provided by the user, and/or the LLM output 204 and/or the textual content 205 generated by the LLM.

Additionally, or alternatively, the generative multimedia content model selection engine 163 can utilize the generative multimedia content prompts to select, from among a plurality of disparate generative multimedia content prompts, a given generative multimedia content model to process the generative multimedia content prompts. As noted above with respect to FIG. 1, the plurality of disparate generative multimedia content prompts can include first-party generative multimedia content models and/or third-party generative multimedia content prompts. Further, the plurality of disparate generative multimedia content prompts can include image generators, video generators, audio generators, and/or any other generative models capable of processing a prompt to generate multimedia content. Moreover, the plurality of disparate generative multimedia content prompts can include image generators, video generators, audio generators, and/or other generative models of varying sizes (e.g., generative models including billions of parameters (e.g., 100 billion parameters, 250 billion parameters, 500 billion parameters, etc.) or millions of parameters (e.g., 100 million parameters, 250 million parameters, 500 million parameters, etc.)). In particular, the generative multimedia content model selection engine 163 can utilize a type of the generative multimedia content to be generated (e.g., as indicated by the generative multimedia content prompts) to select the given generative multimedia content model to process the generative multimedia content prompts.

Moreover, the multimedia content retrieval engine 164 can cause the generative multimedia content prompts to be submitted to the given generative multimedia content model(s) (e.g., via the generative system(s) 180 and over one or more of the networks 199). In response to the generative multimedia content prompts to be submitted to the given generative multimedia content model(s), the multimedia content retrieval engine 164 can obtain the multimedia content 206 for inclusion in the multi-modal response 207. Notably, the rendering engine 112 can initiate rendering of the textual content 205 prior to the multimedia content 206 being obtained to reduce latency in rendering the multi-modal response 207. In some implementations, the multimedia content engine 160 can cause the client device 110 to issue the generative multimedia content prompts such that the generative multimedia content items are directly obtained by the client device 110, thereby further reducing latency in rendering the multi-modal response 207. Thus, a duration of the human-to-computer interaction between the user and the multi-modal response system 120 can be reduced.

Although the above example is described with respect to determining that the response that is responsive to the NL based input 201 should be a multi-modal response that includes both the textual content 205 and the multimedia content 206 based on the LLM output 204 and/or the textual content 205 including the multimedia content tags, it should be understood that is for the sake of example and is not meant to the be limiting. Rather, it should be understood other signals can be utilized (e.g., as described with respect to FIG. 4), such as an explicit intent or inferred intent that the response should be a multi-modal response and/or other contextual signals associated with the client device of the user and/or the user. In implementations where it is determined that the response that is responsive to the NL based input 201 should be a multi-modal response that includes both the textual content 205 and the multimedia content 206 prior to the NL based input being processed by the explicitation LLM engine 141, the explicitation engine 141 can also process a prompt that indicates the response should be a multi-modal response.

In some implementations, a subsequent NL based input can be received (e.g., from the user input engine 111 in a similar manner as described in relation to the NL based input 201). The subsequent NL based input can be indicative of a request for a modification to the set of slides of the multi-modal response. The subsequent NL based input can be processed in a similar manner to that described in relation to the NL based input 201 to provide a subsequent LLM input to the conversational LLM engine 142 to update the set of slides of the multi-modal response accordingly. For instance, the subsequent LLM input can be generated using a template (e.g., using explicitation LLM engine 141, or otherwise). The template can guide the conversational LLM engine 142 to update the set of slides in the desired manner. For instance, the template can include one or more variables that can be determined based on the NL based input. An example of such a template is provided below:

Template 2

I will give you a numbered sequence of slides for a presentation. It was flagged for the following issue <NL BASED INPUT>. I need you to copy the whole presentation while fixing the issues. Here's the presentation:

<ORIGINAL_SLIDES>

#Example Model Output #

Here are the corrected slides:

<NEW_SLIDES>

The subsequent NL based input and the original LLM output 204 (or the multi-modal response 207) can be processed using the conversational LLM engine 142 to generate updated LLM output. An updated multi-modal response can then be generated and rendered at the device. For instance, some or all of the multimedia content 206 can be updated and/or some or all of the textual content can be updated accordingly. For instance, continuing with the above example where the NL based input 201 is the prompt of "show me how to change the oil for a [vehicle model name]", the subsequent NL based input can be "that is a 2015 model. Show me instructions for a 2005 model". As a result, the multi-modal response can be updated such that, for instance, images of the 2015 model of the vehicle in the set of slides can be changed to images of the 2005 model of the vehicle.

In some implementations, the multi-modal response system 120 can be provided as a standalone application (e.g., a standalone NL based response system application). In some other implementations, the system can be provided as part of another application (e.g., as a plug-in, an add-on, etc.). For instance, the system can be provided as an extension (e.g., as an additional toolbar) of a presentation application. As such, in implementations including a determination as to whether to tailor the multi-modal response for a specific type of task, the determination can be based on whether the NL based input was received via an application associated with the particular type of task, and/or whether the application is running or installed on the client device. For instance, a determination can be made to generate a multi-modal response arranged as a set of slides based on the NL based input 201 being received via a presentation application.

Furthermore, in some implementations, the multi-modal response system 120 can output the multi-modal response 207 in a form usable by an application other than the multi-modal response system 120 (in addition to or instead of rendering the multi-modal response 207 at the client device 110). For instance, the system can output the multi-modal response 207 in a file format associated with the intended use of the multi-modal response 207. As an example, when the multi-modal response 207 responsive to the NL based input 201 includes a set of slides, the multi-modal response system 120 can output the multi-modal response 207 in a file format associated with presentations (e.g., .ppt, .pptx, .odp, etc.). The user can thus store the multi-modal response 207 (e.g., at the client device 110, at a remote computing device accessible to the client device 110 and/or the multi-modal response system 120, etc.) for subsequent use by the appropriate application.

Figure 3:
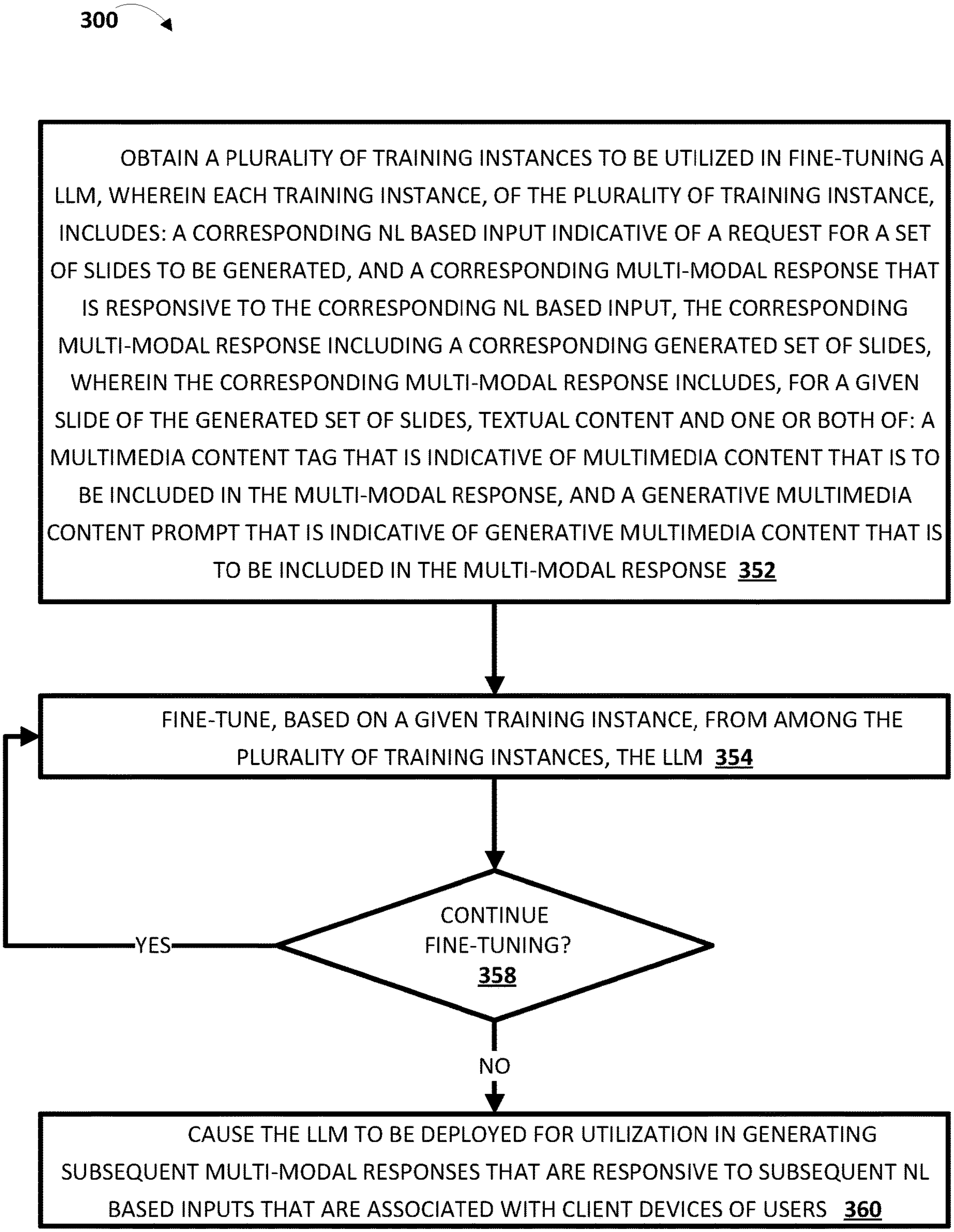
FIG. 3 depicts a flowchart illustrating an example method of fine-tuning a large language model (LLM) to generate multi-modal response(s), in accordance with various implementations.

Turning now to FIG. 3, a flowchart illustrating an example method 300 of fine-tuning a large language model (LLM) to generate multi-modal response(s) is depicted. For convenience, the operations of the method 300 are described with reference to a system that performs the operations. This system of the method 300 includes one or more processors, memory, and/or other component(s) of computing device(s) (e.g., client device 110 of FIG. 1, multi-modal response system 120 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system obtains a plurality of training instances to be utilized in fine-tuning a LLM, each training instance, of the plurality of training instance, includes: (1) a corresponding NL based input indicative of a request for a set of slides to be generated, and (2) a corresponding multi-modal response that is responsive to the corresponding NL based input, the corresponding multi-modal response including a corresponding generated set of slides, the corresponding multi-modal response including, for a given slide of the generated set of slides, textual content and one or both of: a multimedia content tag that is indicative of multimedia content that is to be included in the multi-modal response, or a generative multimedia content prompt that is indicative of generative multimedia content that is to be included in the multi-modal response. For example, the system can cause the training instance engine 131 from FIG. 1 to obtain the plurality of training instances. In some implementations, one or more of the plurality of training instances can be curated by, for example, a developer that is associated with the multi-modal response system 120 from FIG. 1. For instance, the corresponding NL based input and the corresponding textual content of the multi-modal response can be obtained from conversation logs, and the developer can manually add the corresponding multimedia content tag(s) and/or corresponding generative multimedia content prompt(s) into the textual content where the corresponding multimedia content item(s) should be included in the multi-modal response (e.g., with respect to an arrangement of the corresponding textual content), as well as rearranging the textual content and/or multimedia content in a manner suitable for a particular task (e.g., into a series of discrete slides or templates of slides).

In additional or alternative implementations, one or more of the plurality of training instances can be generated using an automated process (e.g., if the number of training instances is limited, for instance, as a result of users assuming that the LLM lacks the functionality to be used in generating slides). For instance, to generate a training instance, an example NL based input indicative of a request for a set of slides to be generated can be generated using the LLM (e.g., responsive to another NL based input to do so). A corresponding multi-modal response can then be generated based on processing the generated NL based input using the LLM. The example NL based input and corresponding multi-modal response can then be stored as a generated training instance. Furthermore, in some implementations, one or more of the plurality of training instances (whether generated or not) can be curated by and/or revised by the LLM. For instance, a training instance can be processed using the LLM to determine the extent to which a multi-modal response is responsive to a corresponding NL based input (e.g., if the NL based input requests a multi-modal response consisting of 5 slides, each with speaker notes, the LLM can be used to determine whether the corresponding multi-modal response does include 5 slides, each with speaker notes). It can then be determined whether to revise the training instance (e.g., using the LLM), or whether to use the training instance as is when fine-tuning the LLM. In these manners, after the LLM is fine-tuned, it can be expected that training instances subsequently generated, curated, and/or revised by the fine-tuned LLM are of a higher quality, leading to improved subsequent fine-tuning of the LLM. This process can be repeated any number of times until the LLM is determined to be fine-tuned to a sufficient degree.

Upon being obtained and/or generated, the training instance engine 131 from FIG. 1 can store the plurality of training instances in the training instance(s) database 130A from FIG. 1.

At block 354, the system fine-tunes, based on a given training instance, from among the plurality of training instances, the LLM. For example, the training engine 132 from FIG. 1 can obtain the given training instance from the training instance(s) database 130A. Further, the training engine 132 can cause the LLM to process the corresponding NL based input and the corresponding multi-modal response of the given training instance. Notably, since the corresponding multi-modal response includes the corresponding multimedia content tag(s) and/or corresponding generative multimedia content prompt(s) indicative of the corresponding multimedia content item(s) to be included in the corresponding multi-modal response and arranged in a manner suitable for a specific use, the LLM is effectively fine-tuned to perform a specific task of determining when to include the corresponding generative multimedia content prompt(s) or the corresponding multimedia content tag(s) and/or where to include them with respect to the corresponding textual content such that the response is suitable for the specific use. Notably, the LLM that is being fine-tuned can be the conversational LLM that is utilized by the conversational LLM engine 142 from FIG. 1.

At block 358, the system determines whether to continue fine-tuning the LLM. The system can determine to continue fine-tuning the LLM until one or more conditions are satisfied. The one or more conditions can include, for example, whether the LLM has been fine-tuned based on a threshold quantity of training instances, whether a threshold duration of time has passed since the fine-tuning process began, whether performance of the LLM has achieved a threshold level of performance, and/or other conditions.

If, at an iteration of block 358, the system determines to continue fine-tuning the LLM, then the system returns to block 354. At a subsequent iteration of block 354, the system fine-tunes, based on a given additional training instance, from among the plurality of training instances, the LLM. The system can continue fine-tuning the LLM in this manner until the one or more conditions are satisfied at a subsequent iteration of block 358.

If, at an iteration of block 358, the system determines not to continue fine-tuning the LLM, then the system proceeds to block 360. At block 360, the system causes the LLM to be deployed for utilization in generating multi-modal responses that are responsive to subsequent NL based inputs that are associated with client devices of users (e.g., as described with respect to FIG. 4).

Figure 4:
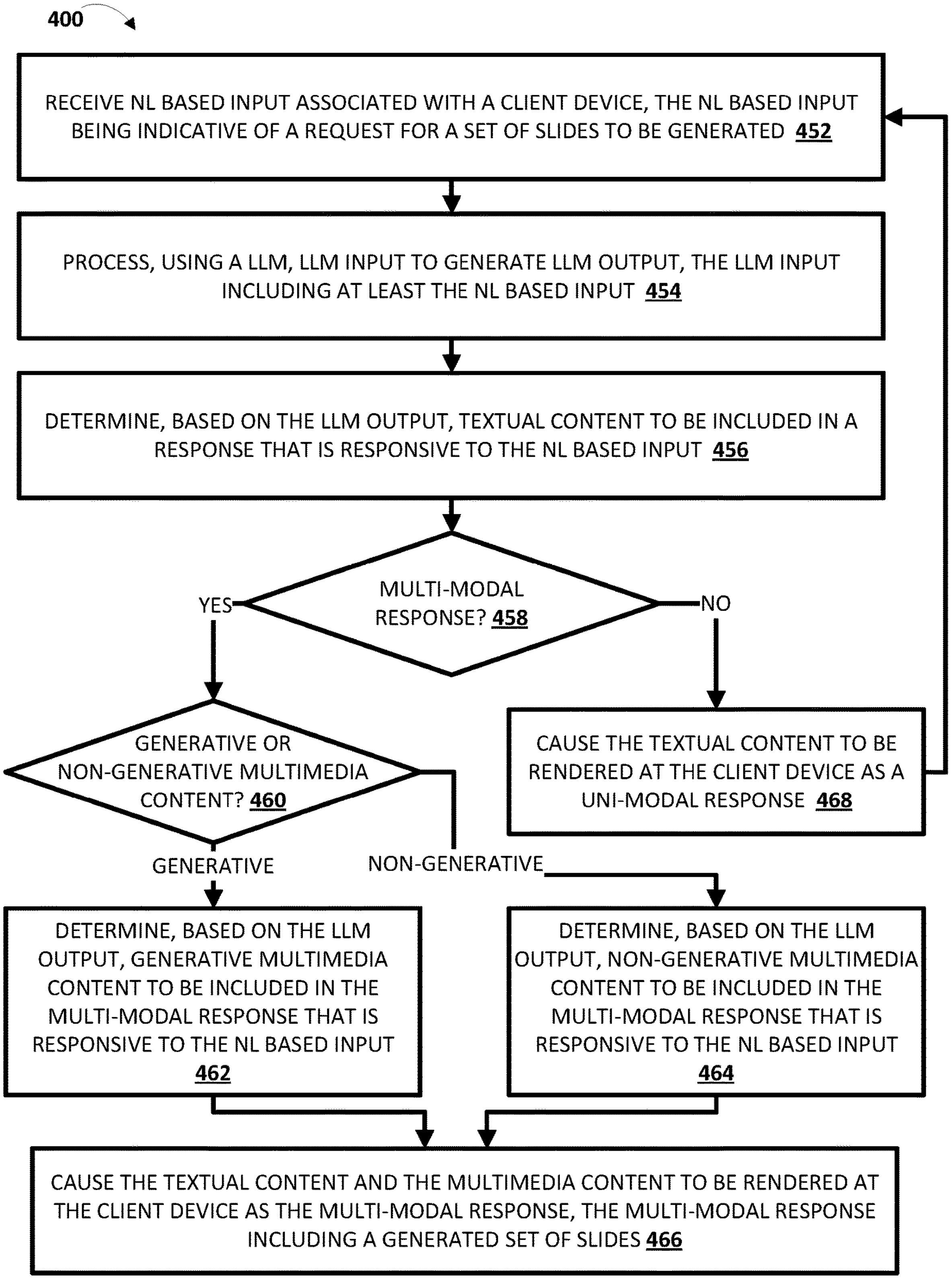
FIG. 4 depicts a flowchart illustrating an example method of generating multi-modal response(s) through utilization of large language model(s) (LLM(s)), in accordance with various implementations.

Turning now to FIG. 4, a flowchart illustrating an example method 400 of generating multi-modal response(s) through utilization of large language model(s) (LLM(s)) is depicted. For convenience, the operations of the method 400 are described with reference to a system that performs the operations. This system of the method 400 includes one or more processors, memory, and/or other component(s) of computing device(s) (e.g., client device 110 of FIG. 1, multi-modal response system 120 of FIG. 1, computing device 610 of FIG. 6, one or more servers, and/or other computing devices). Moreover, while operations of the method 400 are shown in a particular order, this is not meant to be limiting. One or more operations may be reordered, omitted, and/or added.

At block 452, the system receives NL based input associated with a client device. The NL based input can be indicative of a request for a set of slides to be generated and/or indicative of a request for assistance with completing a particular task. The NL based input can be any explicit NL based input (e.g., described with respect to the user input engine 111 from FIG. 1) or implicit NL based input (e.g., described with respect to the implied input engine 114 from FIG. 1) described herein.

At block 454, the system processes, using a LLM, LLM input to generate LLM output, the LLM input including at least the NL based input. In some implementations, the system can cause the explicitation LLM engine 141 from FIG. 1 to process the raw NL based input (and optionally any context or other prompts), using an explicitation LLM (e.g., stored in the LLM(s) database 140A from FIG. 1), to generate the LLM input. In these implementations, the system can cause the conversational LLM engine 142 from FIG. 1, to process, using a conversational LLM (e.g., stored in the LLM(s) database 140A from FIG. 1 and fine-tuned according to the method 300 of FIG. 3), the LLM input to generate the LLM output. However, in various implementations, the explicitation LLM engine 141 from FIG. 1 can be omitted, and the LLM input can correspond to the raw NL based input (and optionally any context or other prompts). As noted above with respect to the process flow 200 of FIG. 2, the LLM output can include, for example, a probability distribution over a sequence of tokens, such as words, phrases, or other semantic units, and optionally generative multimedia content prompt(s) for generative multimedia content item(s) and/or multimedia content tag(s) for non-generative multimedia content item(s) that are predicted to be responsive to the NL based input. The LLM can include millions or billions of weights and/or parameters that are learned through training the LLM on enormous amounts of diverse data. This enables the LLM to generate the LLM output as the probability distribution over the sequence of tokens.

At block 456, the system determines, based on the LLM output, textual content to be included in a response that is responsive to the NL based input. For example, the system can cause the textual content engine 150 from FIG. 1 to determine the textual content (e.g., as described with respect to the process flow 200 of FIG. 2).

At block 458, the system determines whether to generate a multi-modal response that is responsive to the NL based input. In some implementations, the system can determine to generate a multi-modal response that is responsive to the NL based input in response to determining that the LLM output generated at block 454 includes generative multimedia content prompt(s) for generative multimedia content item(s) and/or multimedia content tag(s) for non-generative multimedia content item(s). In additional or alternative implementations, the system can determine to generate a multi-modal response that is responsive to the NL based input in response to determining that the textual content determined at block 456, that is determined based on the LLM output, includes generative multimedia content prompt(s) for generative multimedia content item(s) and/or multimedia content tag(s) for non-generative multimedia content item(s). However, it should be understood that these are only two signals contemplated herein and are not meant to be limiting.

For example, the system can additionally, or alternatively, determine whether to generate a multi-modal response that is responsive to the NL based input prior to the LLM input being processed by the LLM. For instance, the system can determine whether to generate a multi-modal response that is responsive to the NL based input based on a client device context associated with the client device from which the NL based input is received. In these instances, the client device context can include a display size of a display of the client device of the user, network bandwidth of the client device of the user, connectivity status of the client device of the user, a modality by which the NL based input was received, and/or other client device contexts. The client device context can, for instance, serve as a proxy for whether the client device is capable of efficiently rendering multimedia content (e.g., in view of bandwidth and/or connectivity considerations), whether the client device is well suited for rendering different types of multimedia content (e.g., whether the client device includes speaker(s) and/or a display), and/or otherwise indicate whether a multi-modal response should be generated.

Also, for instance, the system can determine whether to generate a multi-modal response that is responsive to the NL based input based on a user context of a user associated with the client device from which the NL based input is received. In these instances, the user context can include a geographical region in which the user is located when the NL based input is received, a user account status of a user account of the user of the client device, historical NL based inputs provided by the user of the client device, or user preferences of the user of the client device, and/or other user contexts. The user context can, for instance, serve as a proxy for whether the user desires multi-modal responses (or desires multi-modal responses in certain situations) and/or otherwise indicates whether a multi-modal response should be generated. In all of the above instances, the system can cause the NL based input and/or the LLM input to be augmented with a prompt that indicates a multi-modal response that includes multimedia content should be generated.

Furthermore, in some implementations, the system can determine whether to generate a set of slides. This can, for instance, be based on similar considerations as discussed above in relation to determining whether to generate a multi-modal response (e.g., client device context, user context, etc.). In addition, this determination can be based on an explicit or implicit intent identified in the NL based input. As another example, the determination can be based on receiving the NL based input via an interface of an associated application (e.g., a presentation application) executed on the device, and/or by determining that the associated application is being executed (or simply installed on the client device or accessible by the client device). In these implementations, the system can determine whether to generate a multi-modal response that is responsive to the NL based input based on determining to generate a set of slides.

If, at an iteration of block 458, the system determines to generate a multi-modal response that is responsive to the NL based input, then the system proceeds to block 460. At block 460, the system determines whether the multi-modal response should include generative multimedia content or non-generative multimedia content. In some implementations, the system can determine whether the multi-modal response should include generative multimedia content or non-generative multimedia content based on, for example, whether the LLM output and/or the textual content includes generative multimedia content prompt(s) for generative multimedia content item(s) and/or multimedia content tag(s) for non-generative multimedia content item(s) that are predicted to be responsive to the NL based input. For instance, if the LLM output and/or the textual content includes generative multimedia content prompt(s) for generative multimedia content item(s), then the system can determine the multi-modal response should include generative multimedia content. Also, for instance, if the LLM output and/or the textual content includes multimedia content tag(s) for non-generative multimedia content item(s), then the system can determine the multi-modal response should include non-generative multimedia content. In additional or alternative implementations, the system can determine whether the multi-modal response should include generative multimedia content or non-generative multimedia content based on other factors. For instance, if the NL based input is associated with a task which has not been documented using multimedia content (e.g., because images or video footage of a particular interaction with a user interface in furtherance of the task are not available), then the system can determine that the multi-modal response should include generative multimedia content (e.g., a generative video of the particular interaction with the user interface).

If, at an iteration of block 460, the system determines the multi-modal response should include generative multimedia content, then the system proceeds to block 462. At block 462, the system determines, based on the LLM output, generative multimedia content to be included in the multi-modal response that is responsive to the NL based input. For example, the system can cause the multimedia content engine 160 from FIG. 1 to determine the generative multimedia content (e.g., as described with respect to the process flow 200 of FIG. 2 and through utilization of the generative system(s) 180). The system proceeds to block 466. Block 466 is described in more detail below.

If, at an iteration of block 460, the system determines the multi-modal response should include non-generative multimedia content, then the system proceeds to block 464. At block 464, the system determines, based on the LLM output, non-generative multimedia content to be included in the multi-modal response that is responsive to the NL based input. For example, the system can cause the multimedia content engine 160 from FIG. 1 to determine the non-generative multimedia content (e.g., as described with respect to the process flow 200 of FIG. 2 and through utilization of the search system(s) 170). The system proceeds to block 466.

At block 466, the system causes the textual content and the multimedia content (e.g., whether generative multimedia content or non-generative multimedia content) of the set of slides to be rendered at the client device as the multi-modal response. For example, the textual content can be visually rendered at a display of the client device of the user. Further, the multimedia content can be visually rendered at the display of the client device of the user (e.g., in instances where the multimedia content includes visual content) and/or audibly rendered via speaker(s) of the client device of the user (e.g., in instances where the multimedia content includes audible content). In some implementations, the multi-modal response can be rendered at the client device in a manner tailored to the task referred to in the NL based input. For instance, each slide of a set of generated slides included in the multi-modal response can be rendered as a distinct graphical element. In other words, textual content and multimedia content associated with a given slide can be rendered in a particular area of the display associated with the slide. For instance, textual content associated with a given slide can be rendered in a first portion of a GUI rendered on a display of the client device, and multimedia content can be rendered in a second portion of the GUI. The first portion and the second portion can thus form at least part of the given slide. Furthermore, in some implementations, as described herein, additional textual content (e.g., speaker notes) which is associated with a given slide but is nonetheless not intended to form part of the given slide (e.g., when it is presented), can be generated based on the LLM output (e.g., in the same or similar manner described with respect to the operations of block 456). As such, the additional textual content can be rendered in a third portion of the GUI, where the third portion does not form part of the given slide. Various non-limiting examples of causing the set of slides including the textual content and the multimedia content to be rendered at the client device as the multi-modal response are described herein (e.g., with respect to FIGS. 5A and 5B). The system returns to block 452 to wait for additional NL based input associated with the client device to be received to perform an additional iteration of the method 400.

If, at an iteration of block 458, the system determines not to generate a multi-modal response that is responsive to the NL based input, then the system proceeds to block 468. At block 468, the system causes the textual content to be rendered at the client device as a uni-modal response. For example, the textual content can be visually rendered at a display of the client device of the user. The system returns to block 452 to wait for additional NL based input associated with the client device to be received to perform an additional iteration of the method 400.

Although the method 400 is described with respect to determining whether the multi-modal response should include generative multimedia content or non-generative multimedia content, it should be understood that is for the sake of example and is not meant to be limiting. Rather, it should be understood that the multi-modal response can include both generative multimedia content and non-generative multimedia content. In these instances, the system can proceed to both blocks 462 and 464 in a parallel manner.

Figure 5A:
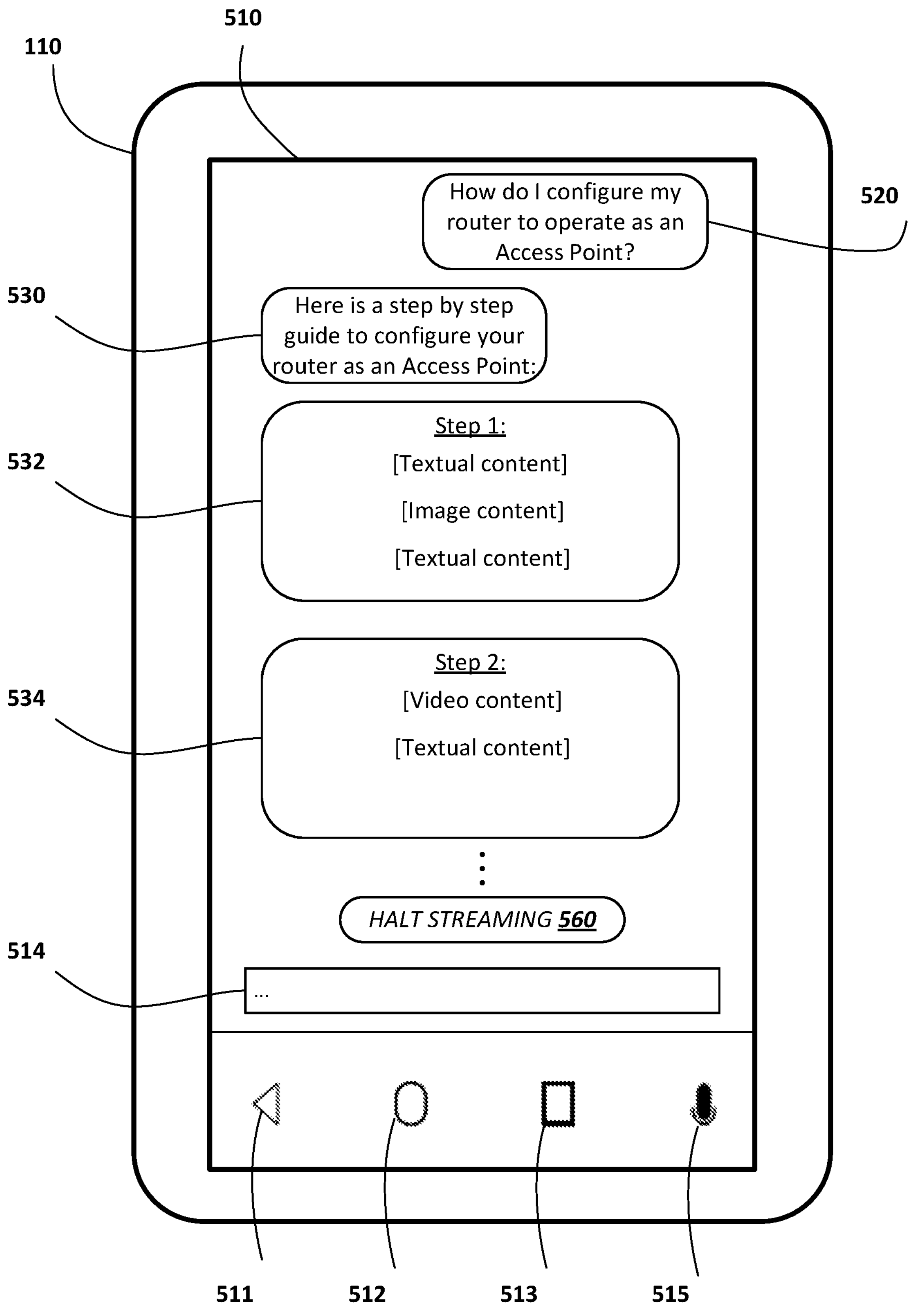
FIG. 5A and FIG. 5B depict various non-limiting examples of generating multi-modal response(s) through utilization of large language model(s) (LLM(s)), in accordance with various implementations.
Figure 5B:
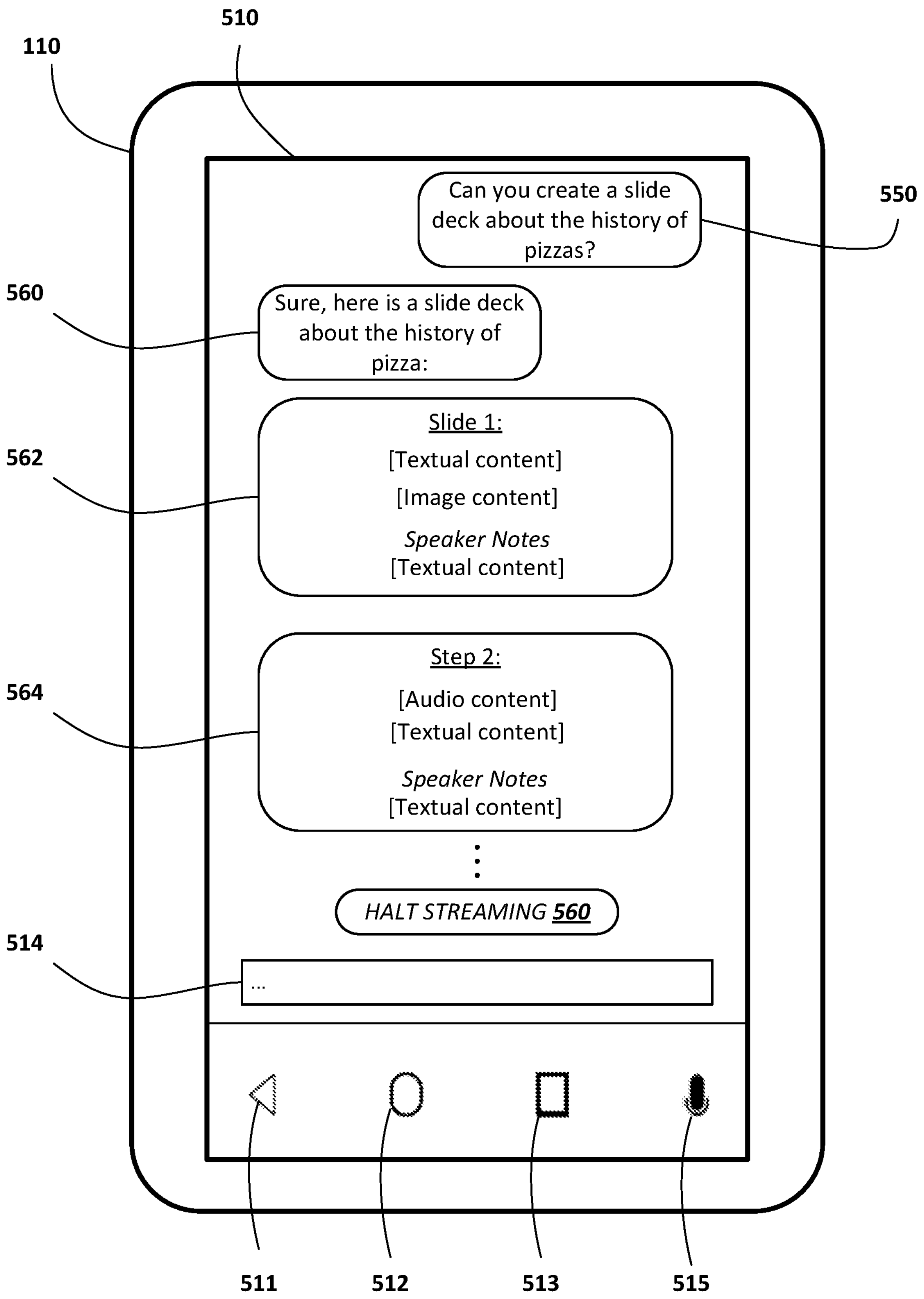

Turning now to FIGS. 5A and 5B, various non-limiting examples of generating multi-modal response(s) through utilization of large language model(s) (LLM(s)) are depicted. The client device 110 (e.g., an instance of the client device 110 from FIG. 1) can include various user interface components including, for example, microphone(s) to generate audio data based on spoken utterances and/or other audible input, speaker(s) to audibly render synthesized speech and/or other audible output, and/or a display 510 to visually render visual output. Further, the display 510 of the client device 110 can include various system interface elements 511, 512, and 513 (e.g., hardware and/or software interface elements) that can be interacted with by a user of the client device 110 to cause the client device 110 to perform one or more actions. The display 510 of the client device 110 enables the user to interact with content rendered on the display 510 by touch input (e.g., by directing user input to the display 510 or portions thereof (e.g., to a text entry box 514, to a keyboard (not depicted), or to other portions of the display 510)) and/or by spoken input (e.g., by selecting microphone interface element 515—or just by speaking without necessarily selecting the microphone interface element 515 (i.e., an automated assistant can monitor for one or more terms or phrases, gesture(s) gaze(s), mouth movement(s), lip movement(s), and/or other conditions to activate spoken input) at the client device 110). Although the client device 110 depicted in FIGS. 5A and 5B is a mobile phone, it should be understood that is for the sake of example and is not meant to be limiting. For example, the client device 110 can be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Referring specifically to FIG. 5A, for the sake of example, assume that a user of the client device 110 provides NL based input 520 of "How do I configure my router to operate as an Access Point". Further assume that a system (e.g., the multi-modal response system 120 from FIG. 1) processes at least the NL based input 520 using an LLM (e.g., that is fine-tuned as described with respect to FIG. 3) to generate LLM output for a multi-modal response including a set of slides (e.g., as described with respect to FIGS. 2 and 4). For instance, assume that the LLM output for the multi-modal response includes an acknowledgement of the NL based input 530, a plurality of slides including at least a first slide 532 and a second slide 534. The first slide 532 includes a title: "Step 1", a first segment of textual content, a second segment of textual content, and image content interleaved between the first segment and second segment of textual content and associated with the first segment of textual content. For instance, the first segment of textual content can identify an application which can be executed to complete this task, and the image content can include a thumbnail of the application to allow a user to easily locate the application on their own device. In some implementations, the textual content and/or the multimedia content can be selectable, as described herein. For instance, in this example, upon selection of the image content, the corresponding application can be opened on the user's device. The second slide 534 includes a title: "Step 2", video content, and textual content below the video content. For instance, the textual content can describe a particular interaction with a user interface of the application, and the video content can illustrate the particular interaction.

It should be understood that in various implementations, prior to the multimedia content being obtained, generative multimedia content prompts and/or multimedia content tags can serve as placeholders for where the multimedia content will be inserted into the multi-modal response once obtained. However, the generative multimedia content prompts and/or multimedia content tags are not typically rendered (e.g., visually and/or audibly) for presentation to the user such that they are not perceivable by the user. Notably, the corresponding textual content can be visually and/or audibly rendered for presentation to the user as they are obtained by the client device 110, and prior to the multimedia content being obtained. Put another way, the client device 110 can stream the textual content as it is obtained but leave space to insert the generative multimedia content as it is obtained. This enables latency in rendering of the multi-modal response to be reduced. Further, a halt streaming selectable element 570 can be provided and, when selected, any streaming of the multi-modal response can be halted to further preserve computational resources if the user decides to no longer receive the multi-modal response.

Further, in some implementations, the multimedia content items can be rendered along with an indication of a corresponding source of each for the multimedia content (e.g., a uniform resource locator (URL) or the like). Moreover, in some implementations, each of the multimedia content items (or the indication of the corresponding sources) can be selectable and, when selected, can cause the client device 110 to navigate (e.g., via a web browser or other application accessible via the application engine 115) to the corresponding generative model(s) utilized in generating the generative multimedia content items.

Turning now to FIG. 5B, for the sake of example, assume that a user of the client device 110 now provides NL based input 550 of "Can you create a slide deck about the history of pizzas". Further assume that a system (e.g., the multi-modal response system 120 from FIG. 1) processes at least the NL based input 550 using an LLM (e.g., that is fine-tuned as described with respect to FIG. 3) to generate LLM output for a multi-modal response including a set of slides (e.g., as described with respect to FIGS. 2 and 4). For instance, assume that the LLM output for the multi-modal response includes an acknowledgment 560 of the NL based input 550, and a plurality of slides including at least a first slide 562 and a second slide 564. The first slide 564 includes a title: "Slide 1", a first segment of textual content, a second segment of textual content under the subtitle: "Speaker Notes", and image content interleaved between the first segment and second segment of textual content and associated with the first segment of textual content. For instance, the first segment of textual content can provide a brief overview of the history of pizza, and the image content can include an image associated with the history of pizza (e.g., an image of an archetypal pizza). The second slide 564 includes a title: "Slide 2", audio content, a first segment of textual content below the audio content, and a second segment of textual content under the subtitle: "Speaker Notes". For instance, the textual content can describe early versions of pizzas, and the audio content can include, for instance, a recording of a historian discussing early versions of pizzas, a generative audio clip of what the creators of early pizzas may have said, etc.

As mentioned, in this example, both slides 562, 564 include additional textual content under the subtitle: "Speaker Notes". This textual content can relate to content intended to be expressed by a presenter (e.g., verbatim, or simply to guide the presenter) when presenting the slides. This textual content may therefore not be intended to be included on the slide when presented to an audience. This can be indicated by the arrangement of this textual content (e.g., by using a subtitle as is the case in the example of FIG. 5B) and/or metadata can be included in the multimodal response to indicate which textual content should not be included on the slide when it is presented. In other words, the LLM can be fine-tuned to be used in generating multi-modal responses that are in a form suitable for their intended task (e.g., in this case, for generating a set of slides including textual content indicated as being used as speaker notes) meaning that the user does not need to manually rearrange the multi-modal response for the intended task.

Figure 6:
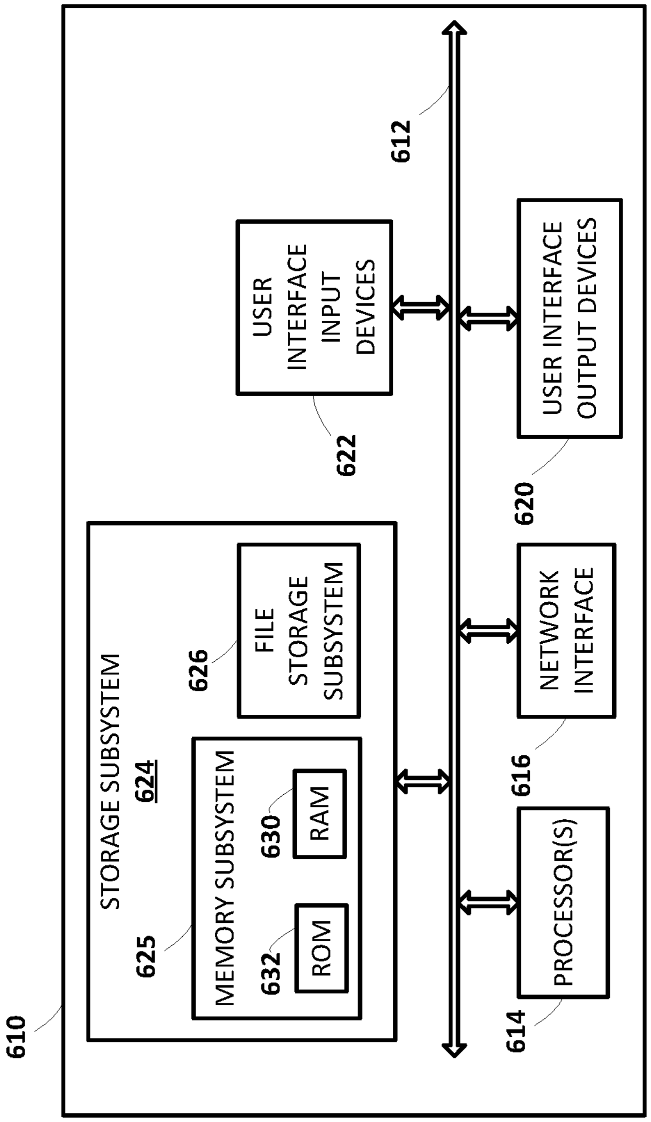
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, multi-modal response system component(s) or other cloud-based software application component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations a method implemented by one or more processors is provided and includes: receiving natural language (NL) based input associated with a client device of a user, the NL based input being indicative of a request for a set of slides to be generated; and generating a multi-modal response that is responsive to the NL based input, the multi-modal response including a generated set of slides. Generating the multi-modal response that is responsive to the NL based input includes: processing, using a large language model (LLM), LLM input to generate LLM output, the LLM input including at least the NL based input; determining, based on the LLM output, and for each slide of the generated set of slides, textual content for inclusion in the multi-modal response and one or both of: a multimedia content tag that is indicative of multimedia content that is to be included in the multi-modal response, or a generative multimedia content prompt that is indicative of generative multimedia content that is to be included in the multi-modal response; and obtaining, based on the multimedia content tag and/or the generative multimedia content prompt, the multimedia content for inclusion in the multi-modal response. The method further includes causing the multi-modal response to be rendered at the client device of the user.

These and other implementations of technology disclosed herein can optionally include one or more of the following features.

In some implementations, the method may further include receiving configuration data associated with the set of slides to be generated. The LLM input processed by the LLM to generate LLM output may include the configuration data. In some versions of those implementations, the configuration data may be extracted from the NL based input. In some additional or alternative versions of those implementations, the configuration data may be indicative of one or more of: a presentation duration, a number of slides to be included in the set of slides to be generated, an amount of multimedia content to include in the set of slides to be generated relative to the textual content included in the set of slides, and one or more types of multimedia content to include in the set of slides to be generated.

In some implementations, the method may further include outputting, to the client device, the multi-modal response in a format suitable for opening by a presentation application.

In some implementations, the method may further include receiving further NL based input associated with the client device, the further NL based input indicative of a request for a modification to the generated set of slides; generating a modified set of slides based on processing, using the LLM, the generated set of slides and the further NL based input; and causing the modified set of slides to be rendered at the client device of the user. In some versions of those implementations, the further NL based input may be indicative of a request for a modification to one or more of the multimedia content items included in the set of slides; and the modified set of slides may be modified to include the modification to the one or more of the multimedia content items.

In some implementations, causing the multi-modal response to be rendered at the client device of the user may include, for a given slide of the generated set of slides: causing textual content associated with the given slide to be visually rendered in a first portion of a graphical user interface (GUI) rendered on a display of the client device; and causing multimedia content associated with the given slide to be rendered in a second portion of the GUI. The first portion and the second portion may form part of the given slide.

In some implementations, the multi-modal response may include, for a given slide of the generated set of slides, textual content and/or multimedia content to be included on the given slide when it is presented, and additional textual content which is not included on the given slide when it is presented. In some versions of those implementations, causing the multi-modal response to be rendered at the client device of the user may include, for a given slide of the generated set of slides: causing textual content associated with the given slide to be visually rendered in a first portion of a graphical user interface (GUI) rendered on a display of the client device; and causing multimedia content associated with the given slide to be rendered in a second portion of the GUI; and causing the additional textual content associated with the given slide to be visually rendered in a third portion of the GUI. The first portion and the second portion may form part of the given slide, but the third portion may be distinct from the first portion and the second portion.

In some implementations, generating the multi-modal response that is responsive to the NL based input may further include determining whether the multi-modal response should include the generated set of slides.

In some implementations, generating the multi-modal response that is responsive to the NL based input may further include determining whether to generate a multi-modal response including both textual content and multimedia content. In some versions of those implementations, generating the multi-modal response that is responsive to the NL based input may further include: responsive to determining to generate a multi-modal response including both textual content and multimedia content, determining whether the multimedia content should be generative multimedia content or non-generative multimedia content.

In some implementations, a method implemented by one or more processors is provided, and includes: receiving natural language (NL) based input associated with a client device of a user, the NL based input being indicative of a request for assistance with completing a particular task; and generating a multi-modal response that is responsive to the NL based input, the multi-modal response including assistive content for assisting the user in performing the particular task. Generating the multi-modal response that is responsive to the NL based input includes: processing, using a large language model (LLM), LLM input to generate LLM output, the LLM input including at least the NL based input; determining, based on the LLM output, textual content for inclusion in the multi-modal response and one or both of: a multimedia content tag that is indicative of multimedia content that is to be included in the multi-modal response, or a generative multimedia content prompt that is indicative of generative multimedia content that is to be included in the multi-modal response; and obtaining, based on the multimedia content tag and/or the generative multimedia content prompt, the multimedia content for inclusion in the multi-modal response. The method further includes causing the multi-modal response to be rendered at the client device of the user.

In some implementations, the method may further include receiving a document including instructions associated with the particular task. The LLM input processed using the LLM to generate the LLM output may include the document. In some versions of those implementations, receiving the document including the instructions associated with the particular task may include: generating, based on the NL based input, a search query that includes a request for the document including the instructions associated with the particular task; submitting, to one or more search systems, the search query;

and in response to submitting the search query to the one or more search systems: receiving the document including the instructions associated with the particular task. In some further versions of those implementations, the LLM may be associated with a first-party entity, and the one or more search systems may be associated with the first-party entity. In additional or alternative further versions of those implementations, the LLM may be associated with a first-party entity, the one or more search systems may be associated with the third-party entity, and the third-party entity may be distinct from the first-party entity.

In some implementations, a method implemented by one or more processors is provided, and includes: obtaining a plurality of training instances to be utilized in fine-tuning a large language model (LLM), wherein each training instance, of the plurality of training instance, includes: a corresponding natural language (NL) based input indicative of a request for a set of slides to be generated, and a corresponding multi-modal response that is responsive to the corresponding NL based input, the corresponding multi-modal response including a corresponding generated set of slides, wherein the corresponding multi-modal response includes, for a given slide of the generated set of slides, textual content and one or both of: a multimedia content tag that is indicative of multimedia content that is to be included in the multi-modal response, or a generative multimedia content prompt that is indicative of generative multimedia content that is to be included in the multi-modal response. The method further includes fine-tuning, based on the plurality of training instances, the LLM; and causing the LLM to be deployed for utilization in generating subsequent multi-modal responses that are responsive to subsequent NL based inputs that are associated with client devices of users.

In some implementations, the training instances may be generated using the LLM.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device of a user, the NL based input being indicative of a request for a set of slides to be generated;

receiving a document associated with the request for the set of slides;

generating a multi-modal response that is responsive to the NL based input, the multi-modal response comprising a generated set of slides, wherein generating the multi-modal response that is responsive to the NL based input comprises:

processing, using a large language model (LLM), LLM input to generate LLM output, the LLM input including at least the NL based input and the document;

determining, based on the LLM output, and for each slide of the generated set of slides, textual content for inclusion in the multi-modal response and a generative multimedia content prompt that is indicative of generative multimedia content that is to be included in the multi-modal response; and obtaining, based on processing the generative multimedia content prompt determined based on the LLM output that is generated using the LLM, and using an image generation model or a video generation model, the generative multimedia content for inclusion in the multi-modal response; and causing the multi-modal response to be rendered at the client device of the user, wherein causing the multi-modal response to be rendered at the client device of the user comprises:

causing the textual content to be rendered while the generative multimedia content is being obtained, the generative multimedia content being obtained based on processing the generative multimedia content prompt determined based on the LLM output that is generated using the LLM, and using the image generation model or the video generation model; and causing, responsive to the generative multimedia content being obtained, the generative multimedia content to be rendered.

2. The method of claim 1, further comprising:

receiving configuration data associated with the set of slides to be generated, wherein the LLM input processed by the LLM to generate LLM output includes the configuration data.

3. The method of claim 2, wherein the configuration data is extracted from the NL based input.

4. The method of claim 2, wherein the configuration data is indicative of one or more of:

a presentation duration, a number of slides to be included in the set of slides to be generated, an amount of multimedia content to include in the set of slides to be generated relative to the textual content included in the set of slides to be generated, and one or more types of multimedia content to include in the set of slides to be generated.

5. The method of claim 1, further comprising:

outputting, to the client device, the multi-modal response in a format suitable for opening by a presentation application.

6. The method of claim 1, further comprising:

receiving further NL based input associated with the client device, the further NL based input indicative of a request for a modification to the generated set of slides;

generating a modified set of slides based on processing, using the LLM, the generated set of slides and the further NL based input; and causing the modified set of slides to be rendered at the client device of the user.

7. The method of claim 6, wherein the further NL based input is indicative of a request for a modification to one or more multimedia content items included in the generated set of slides; and wherein the modified set of slides is modified to include the modification to the one or more multimedia content items.

8. The method of claim 1, wherein causing the multi-modal response to be rendered at the client device of the user comprises, for a given slide of the generated set of slides:

causing corresponding textual content associated with the given slide to be visually rendered in a first portion of a graphical user interface (GUI) rendered on a display of the client device; and causing corresponding multimedia content associated with the given slide to be rendered in a second portion of the GUI, wherein the first portion and the second portion form part of the given slide.

9. The method of claim 1, wherein the multi-modal response includes, for a given slide of the generated set of slides, given textual content and/or given multimedia content to be included on the given slide when it is presented, and given additional textual content which is not included on the given slide when it is presented.

10. The method of claim 9, wherein causing the multi-modal response to be rendered at the client device of the user comprises, for a given slide of the generated set of slides:

causing the given textual content associated with the given slide to be visually rendered in a first portion of a graphical user interface (GUI) rendered on a display of the client device; and causing the given multimedia content associated with the given slide to be rendered in a second portion of the GUI, wherein the first portion and the second portion form part of the given slide; and causing the given additional textual content associated with the given slide to be visually rendered in a third portion of the GUI, wherein the third portion is distinct from both the first portion of the GUI and the second portion of the GUI.

11. The method of claim 1, wherein generating the multi-modal response that is responsive to the NL based input further comprises:

determining whether the multi-modal response should include the generated set of slides.

12. The method of claim 1, wherein generating the multi-modal response that is responsive to the NL based input further comprises:

determining whether to generate the multi-modal response including both the textual content and the multimedia content.

13. The method of claim 12, wherein generating the multi-modal response that is responsive to the NL based input further comprises:

responsive to determining to generate the multi-modal response including both the textual content and the multimedia content, determining whether the multimedia content should be the generative multimedia content or non-generative multimedia content.

14. The method of claim 1, wherein determining the textual content for inclusion in the multi-modal response comprises:

identifying, based on processing the LLM input using the LLM, a first portion of information from the document to be included as visible textual content on a given slide; and identifying, based on processing the LLM input using the LLM, a second portion of information from the document to be included as speaker notes associated with the given slide, wherein the speaker notes are distinct from the visible textual content.

15. The method of claim 1, wherein causing the multimedia content to be rendered responsive to the multimedia content being obtained comprises:

causing, while the multimedia content is being obtained, a placeholder for where the multimedia content will be inserted into the multi-modal response to be rendered; and causing, responsive to the multimedia content being obtained, the multimedia content to replace the placeholder.

16. The method of claim 5, wherein the NL based input is received via a software application accessible via the client device, and wherein the software application differs from the presentation application.

17. A method implemented by one or more processors, the method comprising:

receiving natural language (NL) based input associated with a client device of a user, the NL based input being indicative of a request for assistance with completing a particular task;

receiving a document including instructions associated with the particular task;

generating a multi-modal response that is responsive to the NL based input, the multi-modal response comprising assistive content for assisting the user in performing the particular task, wherein generating the multi-modal response that is responsive to the NL based input comprises:

processing, using a large language model (LLM), LLM input to generate LLM output, the LLM input including at least the NL based input and the document;

determining, based on the LLM output, textual content for inclusion in the multi-modal response and a generative multimedia content prompt that is indicative of generative multimedia content that is to be included in the multi-modal response; and obtaining, based on processing the generative multimedia content prompt determined based on the LLM output that is generated using the LLM, and using an image generation model or a video generation model, the generative multimedia content for inclusion in the multi-modal response; and causing the multi-modal response to be rendered at the client device of the user, wherein causing the multi-modal response to be rendered at the client device of the user comprises:

causing the textual content to be rendered while the generative multimedia content is being obtained, the generative multimedia content being obtained based on processing the generative multimedia content prompt determined based on the LLM output that is generated using the LLM, and using the image generation model or the video generation model; and causing, responsive to the generative multimedia content being obtained, the generative multimedia content to be rendered.

18. The method of claim 17, wherein receiving the document including the instructions associated with the particular task comprises:

generating, based on the NL based input, a search query that includes a request for the document including the instructions associated with the particular task;

submitting, to one or more search systems, the search query; and in response to submitting the search query to the one or more search systems:

receiving the document including the instructions associated with the particular task.

19. The method of claim 18, wherein the LLM is associated with a first-party entity, and wherein the one or more search systems are also associated with the first-party entity.

20. The method of claim 18, wherein the LLM is associated with a first-party entity, wherein the one or more search systems are associated with a third-party entity, and wherein the third-party entity is distinct from the first-party entity.

* * * * *